(12) United States Patent
Batrinu et al.

(10) Patent No.: US 12,056,317 B2
(45) Date of Patent: Aug. 6, 2024

(54) UNDER WATER TOUCH DETECTION WITH ULTRASONIC SENSORS USING CAPACITIVE MICROMACHINED ULTRASONIC TRANSDUCERS (CMUTS)

(71) Applicant: Infineon Technologies AG, Neubiberg (DE)

(72) Inventors: Costin Batrinu, Bucharest (RO); Emanuel Stoicescu, Bucharest (RO); Gheorghe-Iulian Chivu, Targoviste (RO); Victor-Valentin Mocanu, Braila (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/469,019

(22) Filed: Sep. 18, 2023

(65) Prior Publication Data

US 2024/0184406 A1 Jun. 6, 2024

Related U.S. Application Data

(60) Provisional application No. 63/386,053, filed on Dec. 5, 2022.

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01)

(58) Field of Classification Search
CPC ............................... G06F 3/043; G06F 3/0416
See application file for complete search history.

(56) References Cited

U.S. PATENT DOCUMENTS

| 11,768,562 B1* | 9/2023 | Plaiseanu | G06F 3/0418 |
| | | | 345/177 |
| 11,934,610 B2* | 3/2024 | Hou | G06F 3/04166 |
| 2009/0235750 A1* | 9/2009 | Chang | G06F 3/043 |
| | | | 73/627 |
| 2016/0011722 A1* | 1/2016 | Lin | H10N 30/302 |
| | | | 345/174 |
| 2018/0101711 A1* | 4/2018 | D'Souza | G06V 40/1306 |
| 2024/0068439 A1* | 2/2024 | Huang | F03D 3/062 |
| 2024/0094850 A1* | 3/2024 | Stoicescu | G06F 3/04186 |

* cited by examiner

*Primary Examiner* — Dmitriy Bolotin
(74) *Attorney, Agent, or Firm* — Harrity & Harrity, LLP

(57) ABSTRACT

An ultrasonic touch sensor includes a touch structure including a touch surface configured to receive a touch, a signal generator configured to generate an excitation, a capacitive ultrasonic transmitter configured to transmit an ultrasonic transmit wave toward the touch structure based on the excitation signal while the touch surface is submerged under the water, a capacitive ultrasonic receiver configured to receive an ultrasonic reflected wave produced by a reflection of the ultrasonic transmit wave at the touch structure while the touch surface is submerged under the water and generate a measurement signal representative of the ultrasonic reflected wave, and a measurement circuit configured to perform a comparison based on the measurement signal and a threshold, and determine whether a no-touch event or a touch event has occurred at the touch surface while the touch surface is submerged under the water based on whether the measurement signal satisfies the threshold.

27 Claims, 9 Drawing Sheets

UNDER WATER TOUCH DETECTION WITH ULTRASONIC SENSORS USING CAPACITIVE MICROMACHINED ULTRASONIC TRANSDUCERS (CMUTS)

CROSS REFERENCE TO RELATED APPLICATION

This Patent Application claims priority to U.S. Provisional Patent Application No. 63/386,053, filed on Dec. 5, 2022, and entitled "UNDER WATER TOUCH DETECTION WITH ULTRASONIC SENSORS USING CAPACITIVE MICROMACHINED ULTRASONIC TRANSDUCERS (CMUTs)." The disclosure of the prior Application is considered part of and is incorporated by reference into this Patent Application.

BACKGROUND

Touch sensing through metal surfaces using ultrasound waves is currently being investigated as an alternative to capacitive touch sensing principles. Ultrasonic sensing relies on a transmission of an ultrasound wave directed at a touch structure and a reception and processing of a reflected waveform that is reflected back from the touch structure. A characteristic of the reflected waveform will depend on an existence or a non-existence of a touch event and can be used to discriminate between the existence or the non-existence of the touch event.

SUMMARY

In some implementations, an ultrasonic touch sensor configured to be submerged under water includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate a first excitation signal for producing a first ultrasonic transmit wave; a capacitive ultrasonic transmitter arranged within the ultrasound chamber, wherein the capacitive ultrasonic transmitter is configured to receive the first excitation signal and transmit the first ultrasonic transmit wave toward the touch structure based on the first excitation signal while the touch surface is submerged under the water; a capacitive ultrasonic receiver arranged within the ultrasound chamber, wherein the capacitive ultrasonic receiver is configured to receive a first ultrasonic reflected wave produced by a reflection of the first ultrasonic transmit wave at the touch interface while the touch surface is submerged under the water and generate a first measurement signal representative of the first ultrasonic reflected wave; and a measurement circuit coupled to the capacitive ultrasonic receiver and configured to perform a first comparison based on the first measurement signal and a first threshold, and determine whether a no-touch event or a touch event has occurred at the touch surface while the touch surface is submerged under the water based on whether the first measurement signal satisfies the first threshold.

In some implementations, an ultrasonic touch sensor includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive an ultrasonic reflected wave produced by a reflection of the ultrasonic transmit wave at the touch structure and generate a measurement signal representative of the ultrasonic reflected wave; a mode detection circuit configured to analyze a surrounding environment of the ultrasonic touch sensor and determine whether the surrounding environment is an air environment or a water environment, wherein the mode detection circuit is configured to configure the ultrasonic touch sensor into a first operation mode on a first condition the air environment is detected and configure the ultrasonic touch sensor into a second operation mode on a second condition the water environment is detected; and a measurement circuit coupled to the capacitive ultrasonic receiver for receiving the measurement signal, wherein, while configured in the first operation mode, the measurement circuit is configured to perform a first comparison based on the measurement signal and a first threshold and determine whether a no-touch event or a touch event has occurred at the touch surface based on whether the measurement signal satisfies the first threshold, wherein, while configured in the second operation mode, the measurement circuit is configured to perform a second comparison based on the measurement signal and a second threshold and determine whether the no-touch event or the touch event has occurred at the touch surface based on whether the measurement signal satisfies the second threshold, and wherein the first threshold and the second threshold are different thresholds.

In some implementations, an ultrasonic touch sensor configured to be submerged under water includes a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal while the touch surface is submerged under the water; a capacitive ultrasonic receiver arranged within the ultrasound chamber, wherein the capacitive ultrasonic receiver is configured to receive an ultrasonic reflected wave produced by a reflection of the ultrasonic transmit wave at the touch interface while the touch surface is submerged under the water and generate a measurement signal representative of the ultrasonic reflected wave; and a measurement circuit coupled to the capacitive ultrasonic receiver and configured to monitor for a signal change of the measurement signal during a predetermined time interval corresponding to the ultrasonic reflected wave, and determine whether a no-touch event or a touch event has occurred at the touch surface while the touch surface is submerged under the water based on whether the signal change is detected during the predetermined time interval.

BRIEF DESCRIPTION OF THE DRAWINGS

Implementations are described herein with reference to the appended drawings.

DETAILED DESCRIPTION

Figure 1:
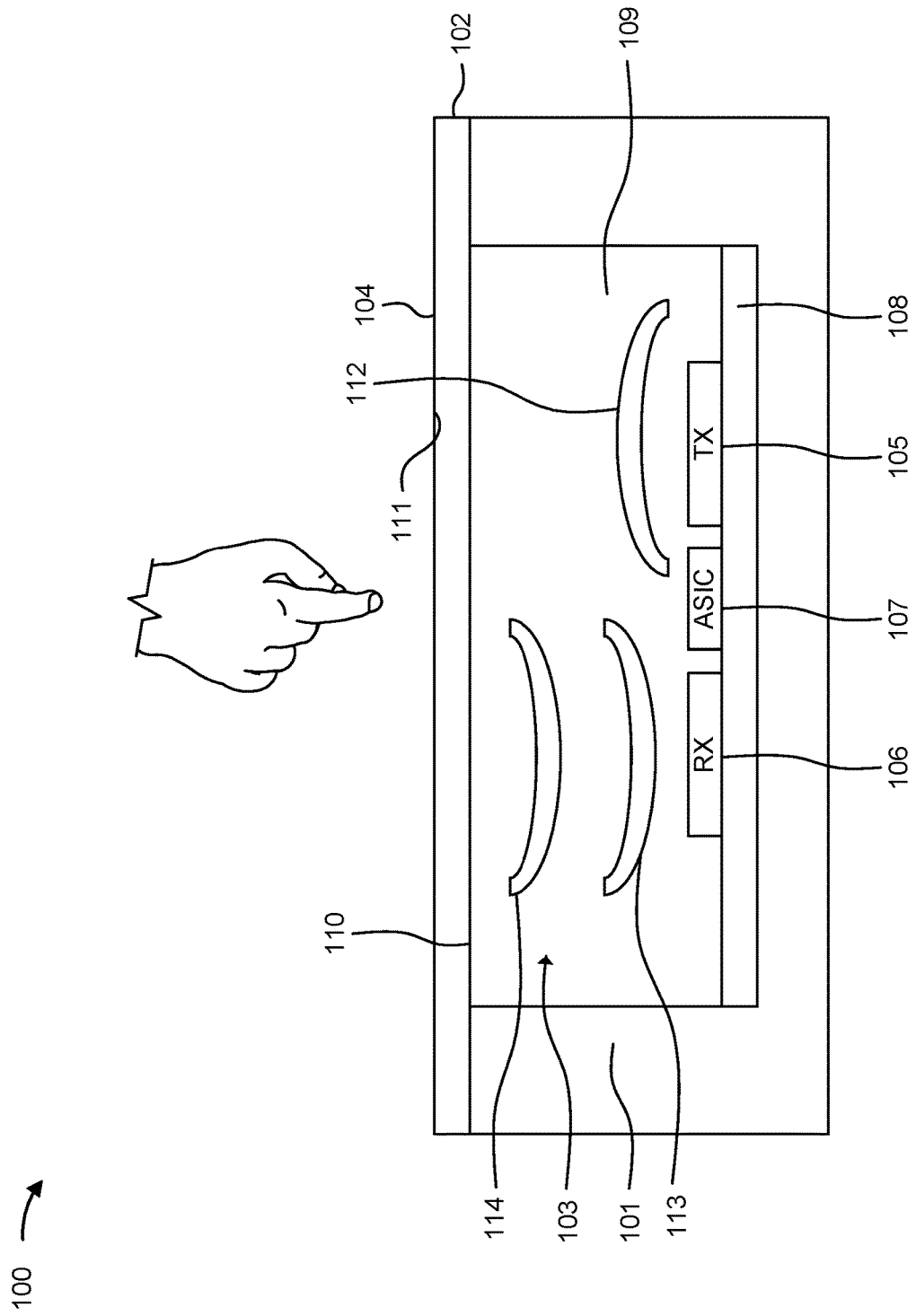
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electrical signal (e.g., a current signal or a voltage signal). For a capacitive touch sensor, the property to be measured is a capacitance that is detected directly from a user making skin contact with a touch structure. For example, a conductive material may be coated on a non-touch side of the touch structure and a capacitor may be formed within the touch structure (e.g., between the conductive material disposed on the non-touch side and a touch side) when skin contact is made to the touch side of the touch structure. The capacitive touch sensor may measure a capacitance within the touch structure and detect changes in the capacitance for detecting touches. However, capacitive touch sensors are prone to false signals (e.g., false touch detections) and cannot operate reliably, if at all, when the touch surface is exposed to water. Thus, there is an interruption in touch detection functionality when the capacitive touch sensor is wet or submerged in water or another liquid. Because the capacitive touch sensor cannot operate correctly in a reliable manner when the touch surface is wet or submerged in water, a user is not able to properly interact with the capacitive touch sensor when the touch surface is wet or submerged in water.

In addition, a mechanical button with water tightness (e.g., a water seal) may be used for underwater applications. However, mechanical buttons are susceptible to water damage and mechanical failure. Additionally, a case of a device in which the touch sensor is implemented is typically perforated, leading to a potential for water infiltration.

For an ultrasonic touch sensor, the property to be measured is an ultrasound wave produced, for example, by a microelectromechanical system (MEMS) transducer. The ultrasound wave is directed at a touch structure where the ultrasound wave is reflected back by the touch structure as a reflected ultrasound wave. The reflected ultrasound wave can be used for sensing touch (e.g., a touch event) through metal surfaces. Specifically, the ultrasonic touch sensor can use the reflected ultrasound wave to discriminate between an existence of the touch event or a non-existence of the touch event (e.g., a no-touch event).

Some implementations disclosed herein are directed to using an ultrasonic touch sensor to discriminate between touch and no touch events, even when submerged in water or another liquid. The ultrasonic touch sensor may use capacitive micromachined ultrasonic transducers (CMUTs) as sensor elements to make touch/no-touch decisions when a touch surface of the ultrasonic touch sensor is exposed to air (e.g., when not submerged in liquid) and to make touch/no-touch decisions when the touch surface of the ultrasonic touch sensor is submerged in or otherwise exposed to a liquid. The CMUTs use ultrasound waves as a basis for the touch/no-touch decision.

In some implementations, the ultrasonic touch sensor can detect and/or reject water contact while still performing its primary role as a touch sensor.

In some implementations, the ultrasonic touch sensor can detect direct touches (skin contact) and indirect touches while underwater.

In some implementations, the ultrasonic touch sensor can be placed inside a waterproof case and still allow for touch sensing on the outer surface of the waterproof case without any perforation of the waterproof case.

The ultrasonic touch principle relies on a good contact being made between finger and the touch surface (e.g., a contact surface). This implies that most of the air molecules are pushed away from the touch surface, thus enabling the ultrasonic touch sensor to detect that a part of a signal energy of a transmitted ultrasound wave is absorbed by the finger instead of being reflected back by air or other medium, such as water.

Some implementations are directed to a technique to achieve ultrasonic touch sensing even when the touch surface is completely submerged in water by taking advantage of the improved finger-to-surface contact enabled by water. When water is present at the touch surface of the ultrasonic touch sensor, the touch surface becomes more sensitive to touches, including indirect touches that may be made by another material (e.g., plastic, rubber), as a result of the properties of the ultrasound waves. This increased sensitivity results in higher energy absorption and a larger amplitude decrease in an ultrasound echo received by a sensor element from the outer interface of the ultrasonic touch sensor, where the outer interface corresponds to an interface at the touch surface. The touch surface may be insensitive to indirect touches in the absence of water.

When water is present on the touch surface of the ultrasonic touch sensor, a further decrease of the reflected signal's energy is observed when performing a touch gesture on wet material versus. performing the same gesture on dry material. This effect can be used to detect a touch gesture even under water. Measurement signals derived from ultrasonic reflected waves received from an outer interface of the touch sensor located at the touch surface have different signal patterns when air is present at the touch surface (e.g., when the touch surface is dry) and when water is present at the touch surface (e.g., when the touch surface is wet). For example, a large peak of a no-touch signal (air environment+ no touch) is observed as a result of an ultrasonic reflected wave (e.g., an echo) being received from the outer interface of the touch sensor located at the touch surface. Other signal peaks can be observed underneath this large peak of the no-touch signal (air environment+no touch), indicative of reductions in amplitudes of respective ultrasonic reflected waves received by a receiver (RX) MEMS (e.g., an RX CMUT) under different circumstances (e.g., air environment+touch, water environment+touch, and water environment+no touch). Changes in signal amplitude of the ultrasonic reflected waves occur for indirect touches in an underwater environment that can be used to detect indirect touches made underwater.

FIG. 1 illustrates an ultrasonic touch sensor 100 according to one or more implementations. The ultrasonic touch sensor 100 includes a housing comprising a frame 101 and a touch structure 102 (e.g., a touch substrate) that form an ultrasound chamber 103. The frame 101 may be made of an encapsulant, such as overmolded thermoplastic or another type of molding material. As part of the housing, the frame 101 may have a recess that becomes the ultrasound chamber 103 when the touch structure 102 encloses the recess. In some implementations, part of the frame 101 may extend into and fill the ultrasound chamber 103, thereby covering one or more sensor components arranged therein. Epoxy or some other ultrasound-compatible material cast in the recess may be used. Accordingly, an area of the housing in which ultrasonic transducers reside may be referred to as an acoustic port, an ultrasound port, an acoustic chamber, or an ultrasound chamber, among other examples.

In either case, the touch structure 102 is used as a lid or a package cover that rests upon a touch side of the ultrasonic touch sensor 100. In the example shown, the ultrasound chamber 103 is an internal area or a cavity that is formed by the enclosure of the frame 101 and the touch structure 102. The touch structure 102 may be made of one or more metal layers, one or more plastic layers, and/or one or more layers made out of another solid material. Thus, the touch structure 102 may be a covering coupled to the frame 101, and the ultrasound chamber 103 may be an internal area that is defined, at least in part, by the touch structure 102 (e.g., an internal area defined between the frame 101 and the touch structure 102). The touch structure 102 includes a touch surface 104 at its external interface with an environment. The touch surface 104 is arranged and operable to receive contact (e.g., touches) from a user that can be detected by sensor circuitry.

In some implementations, lateral sides of the frame 101 may be at least partially open such that the ultrasound chamber 103 is not a fully enclosed volume. For example, the lateral sides of the frame 101 may include columns that support the touch structure 102 and/or the touch structure 102 may be supported by a coupling medium. For example, the coupling medium, such as a film layer, a silicone gel, or a soft epoxy, may be provided in the ultrasound chamber 103 and may be mechanically coupled to and between a circuit substrate at a bottom side of the ultrasound chamber 103 and the touch structure 102 at a top side of the ultrasound chamber 103 to provide support to the touch structure 102. In some implementations, the lateral sides of the ultrasound chamber 103 may be fully open, with the lateral sides of the frame 101 being absent, and the touch structure 102 may be partially or fully supported by the coupling medium. Thus, the coupling medium may be sufficiently rigid to support the touch structure 102 in cases which the lateral sides of the ultrasound chamber 103 are fully open.

The ultrasound chamber 103 contains the sensor circuitry used for detecting no-touch events and touch events at the touch surface 104. A touch event is an instance when the user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves for detecting no-touch events and touch events by applying a first touch detection algorithm, and control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be CMUTs. In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal and transmit the excitation signal to the transmitter 105. The excitation signal is applied across the biased electrodes, causing the flexible membrane to vibrate according to the waveform of the excitation signal and producing a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

The transmitter 105, the receiver 106, and the sensor circuit 107 may be arranged on a common circuit substrate 108 (e.g., a printed circuit board (PCB)) that is disposed at a base of the frame 101. The common circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the ultrasound chamber 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the ultrasound chamber 103 are fully open).

The touch structure 102 has a first interface 110 and a second interface 111 that interacts with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the ultrasound chamber 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113 and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can also be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104 based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch and no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch and no-touch event using a machine learning model. The machine learning model may include and/or may be associated with, for example, a neural network. In some implementations, the sensor circuit 107 uses the machine learning model to distinguish between a touch and no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

The touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoidal, Gaussian, Gaussian derivative, etc.) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such a down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

As indicated above, FIG. 1 is provided as an example. Other examples may differ from what is described with regard to FIG. 1. For example, in some implementations, an array or transmitters, receivers, or transceivers may be provided within the ultrasound chamber 103 of the ultrasonic touch sensor 100. In some implementations, the touch structure 102 may include multiple layers resulting in more than two ultrasound reflections or echoes. In some implementations, additional circuit components may be added without deviating from the disclosure provided above.

Figure 2:
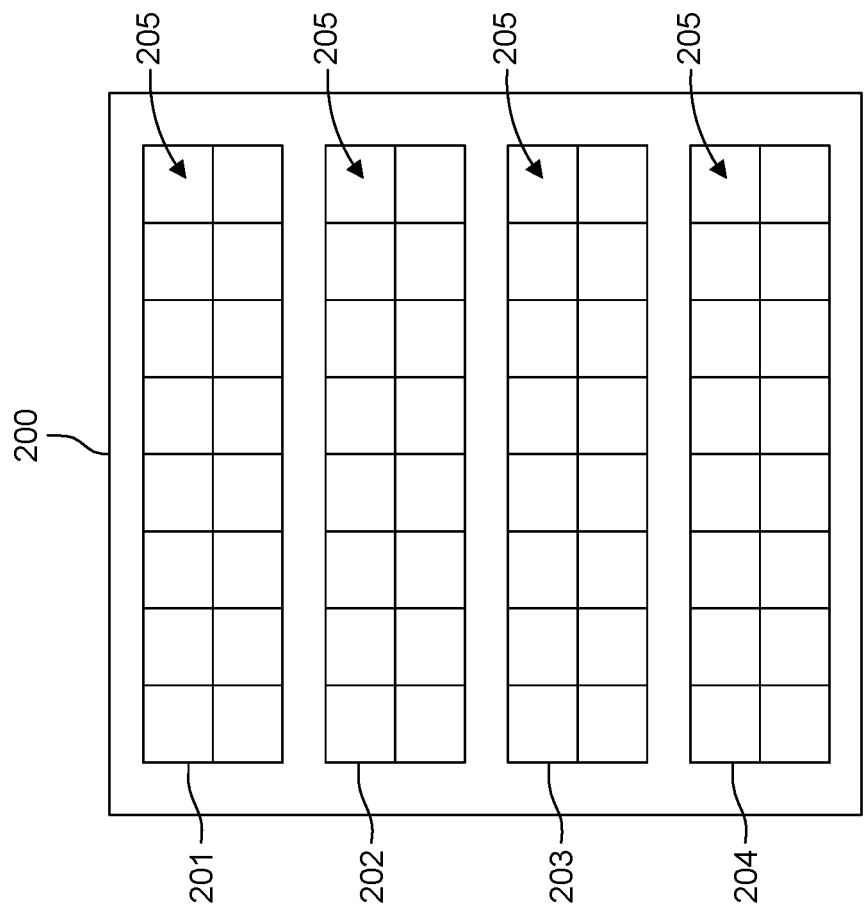
FIG. 2 illustrates a top view of an array of transceiver transducers according to one or more implementations.

FIG. 2 illustrates a top view of an array of transceiver transducers 200 according to one or more implementations. The array of transceiver transducers 200 extends in two dimensions within the ultrasound chamber 103 to cover a substantial area under the touch structure 102. The array of transceiver transducers 200 may include two or more sub-arrays 201-204 that each includes a subset of transceiver transducers 205. Individual transceiver transducers 205 of the array of transceiver transducers 200 are configurable as transmitters, receivers, or transceivers. Additionally, the individual transceiver transducers 205 of the array of transceiver transducers 200 may be individually configured into a receiving mode, a transmitting mode, or a transceiving mode on a static (e.g., fixed) basis or on a dynamic basis. As a result, the transceiver transducers 205 may be configured to provide a configuration best suited for making a touch/no-touch decision.

This configurability may be set on an individual basis (transducer-by-transducer), on a sub-array basis, or some other basis. Moreover, while the transceiver transducers 205 are shown to be substantially equal in size, the transceiver transducers 205 may vary in size. For example, the transducers of sub-array 201 may be larger than the transducers of sub-array 202. The size of an acoustic wave produced by a single transducer is proportional to the size (i.e., to the membrane area) of that transducer.

Each of the transceiver transducers 205 of the array of transceiver transducers 200 is separately controllable by the sensor circuit 107. The transceiver transducers 205 may be individually excited, alone or in combination, as transmitters and may be individually configured, alone or in combination, for receiving ultrasound waves. When one or more transceiver transducers 205 are excited, each transceiver transducer 205 produces its own ultrasonic transmit wave with acoustic aperture or beam width (e.g., proportional to the size of the membrane). If two or more transceiver transducers 205 are activated simultaneously, their respective ultrasonic transmit waves combine either constructively or deconstructively via constructive or deconstructive interference to produce a combined (superimposed or compounded) ultrasonic transmit wave that has a main directivity lobe and possibly additional side lobes. The individual wavefronts may be spherical, but the individual wavefronts may combine in front of the array of transceiver transducers 200 to create a plane wave, which is a beam of ultrasonic waves travelling in a specific direction. The transmission direction or orientation angle of the main directivity lobe is said to correspond to the traveling direction of the plane wave. When only a single transmit transducer is activated, the main directivity lobe corresponds to the individual wavefront produced by that transmit transducer.

Whether one transceiver transducer 205 is excited or multiple transceiver transducers 205 are excited, the main directivity lobe has one or more directivity characteristics that can be adjusted by a controller. Directivity characteristics of the main directivity lobe includes transmission direction, orientation angle, acoustic aperture size, beam width, or beam height, among other examples. As a result, beam sizing, beam forming, and beam steering can be realized by modulating the activation of the transceiver transducers 205 to control the directivity characteristic of the main directivity lobe by selectively generating at least one respective excitation signal. Changing the directivity characteristic of the main directivity lobe changes the area of incidence of the main directivity lobe on the first interface 110 and the second interface 111.

A receiver circuit of the sensor circuit 107 is configured to receive at least one measurement signal generated by one or more transceiver transducers and determine whether a no-touch event or a touch event has occurred at the touch surface 104 based on at least one measurement signal received from the array of transceiver transducers 200. In some implementations, the receiver circuit may perform a signal amplitude threshold analysis by comparing the amplitude(s) of received measurement signal(s) with a threshold and determining whether a touch event or a no-touch event has occurred based on a result of the comparison.

The sensor circuit 107 further includes a controller (e.g., a microcontroller) configured to modulate an activation of the transceiver transducers 205 or the operating modes of the transceiver transducers 205.

As indicated above, FIG. 2 is provided as an example. Other examples may differ from what is described with regard to FIG. 2. In some implementations, additional circuit components may be added without deviating from the disclosure provided above.

Figure 3:
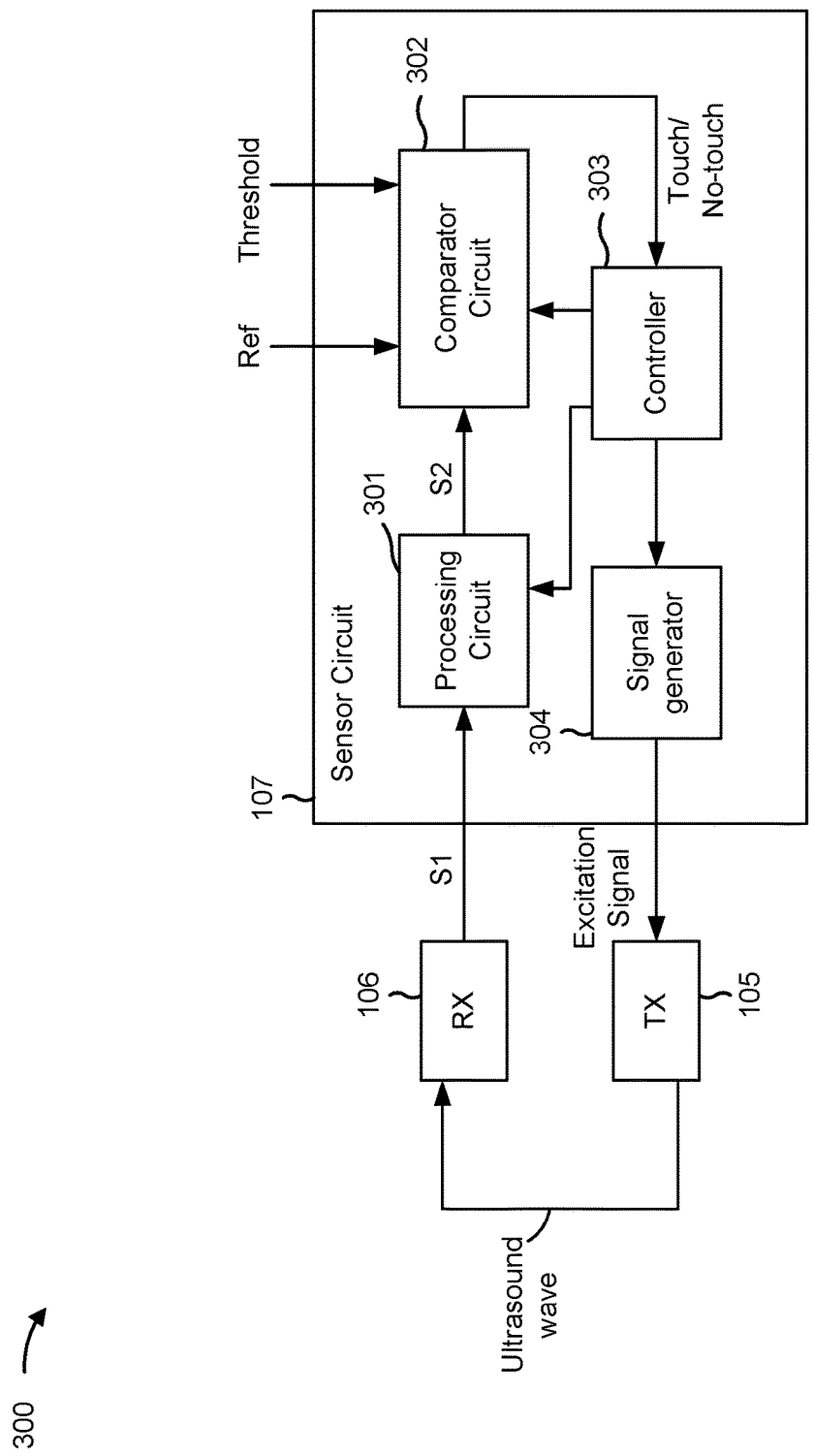
FIG. 3 illustrates a schematic block diagram of an ultrasonic touch sensor according to one or more implementations.

FIG. 3 illustrates a schematic block diagram of an ultrasonic touch sensor 300 according to one or more implementations. The ultrasonic touch sensor 300 is similar to the ultrasonic touch sensor 100 described above in conjunction with FIG. 1. The ultrasonic touch sensor 300 includes the transmitter 105 and the receiver 106. The transmitter 105 and the receiver 106 are acoustically coupled such that the receiver 106 receives reflected ultrasound waves (e.g., ultrasonic reflected waves 113 and 114) from an ultrasound wave (e.g., ultrasonic transmit wave 112) transmitted by the transmitter 105.

The ultrasonic touch sensor 300 also includes a sensor circuit 107 that is electrically coupled to the transmitter 105 and the receiver 106. In some implementations, the sensor circuit 107 includes a processing circuit 301, a comparator circuit 302, a controller 303, and a signal generator 304. The processing circuit 301 and the comparator circuit 302 may form a measurement circuit used for measuring signals and determining whether a no-touch event or a touch event has occurred at the touch surface 104.

In some implementations, the controller 303 may control (e.g., trigger) the signal generator 304 to generate an excitation signal and transmit the excitation signal to the transmitter 105. The transmitter 105 is configured to receive the excitation signal and transmit the ultrasonic transmit wave 112 toward the touch structure 102 based on the excitation signal.

The receiver 106 may be configured to generate a measurement signal S1 representative of an ultrasonic reflected wave (e.g., ultrasonic reflected wave 114), which may be evaluated during a corresponding observation window.

The processing circuit 301 is configured to process the measurement signal S1 in order to determine a feature of the measurement signal S1 and generate a measured value S2 based on the feature of the measurement signal S1. In some implementations, the processing circuit 301 may include a processor, included in the sensor circuit 107, that is configured to evaluate the feature of the measurement signal S1 in order to generate the measured value S2 that is representative of the feature of the measurement signal S1. The processor may include an analog processing circuit that operates in an analog domain, a digital processing circuit that operates in a digital domain, or both the analog processing circuit and the digital processing circuit, for evaluating the feature of the measurement signal S1 and for generating the measured value S2. Thus, the measured value S2 may be an analog value or a digital value.

The processor may be operable in combination with other processing components of the processing circuit 301 described herein to generate the measured value. For example, the processing circuit 301 may include an ADC that converts the measurement signal S1 into the digital domain for processing by a digital processor, such as a digital signal processor (DSP). The ADC may generate multiple digital samples (e.g., measurement samples) from the measurement signal S1 during the corresponding observation window and provide the multiple digital samples to the digital processor for processing. The processor may receive the multiple digital samples and generate the measured value S2 from one or more of the multiple digital samples.

In some implementations, the processing circuit 301 (e.g., the processor) may be configured to measure a function of an amplitude of the measurement signal S1 during the corresponding observation window to generate the measured value S2. For example, the measured value S2 may be a global extremum of the measurement signal S1 measured within a predetermined measurement interval (e.g., the corresponding observation window), a maximum peak-to-peak amplitude of the measurement signal S1 measured within the predetermined measurement interval, an average amplitude of the measurement signal S1 measured within the predetermined measurement interval, or a median amplitude of the measurement signal S1 measured within the predetermined measurement interval.

In some implementations, the processing circuit 301 (e.g., the processor) may be configured to calculate a distance of the measurement signal S1 relative to the reference signal during the corresponding observation window to generate the measured value S2. For example, the processing circuit 301 may calculate a Euclidean distance between the measurement signal S1 and the reference signal as the measured value S2, a squared Euclidian distance between the measurement signal S1 and the reference signal as the measured value S2, a Chebyshev distance between the measurement signal S1 and the reference signal as the measured value S2, a Manhattan distance between the measurement signal S1 and the reference signal as the measured value S2, or a Minkowski distance between the measurement signal S1 and the reference signal as the measured value S2.

The comparator circuit 302 is configured to perform a comparison of the measurement signal S1 with a threshold and determine whether a no-touch event or a touch event has occurred at the touch surface 104 based on whether the first measurement signal S1 satisfies the threshold. In some implementations, the comparator circuit 302 may compare the measured value S2 to the threshold, detect the no-touch event when the measured value S2 does not satisfy the threshold (e.g., the measured value S2 is equal to or greater than the threshold, the measured value S2 is greater than the threshold, or the measured value S2 does not satisfy another condition relative to the threshold), and detect the touch event when the measured value S2 satisfies the threshold (e.g., the measured value S2 is equal to or less than the threshold, the measured value S2 is less the threshold, or the measured value S2 satisfies another condition relative to the threshold).

In some implementations, the comparator circuit 302 may detect the no-touch event when a difference between the measured value S2 and a first reference value Ref does not satisfy the threshold (e.g., the difference is equal to or less than the threshold, the difference is less the threshold, or the difference satisfies another condition relative to the threshold), and detect the touch event when the difference between the measured value S2 and the reference value Ref satisfies the threshold (e.g., the difference is equal to or greater than the threshold, the difference is greater than the threshold, or the difference satisfies another condition relative to the threshold). For example, the comparator circuit 302 may calculate the difference between the measured value S2 and the reference value Ref for performing a comparison of the difference with the threshold for generating a comparison result.

If the sensor circuit 107 calculates the measured value S2 as the distance of the measurement signal S1 relative to the reference signal, the comparator circuit 302 may be configured to detect the no-touch event when the measured value S2 does not satisfy the threshold (e.g., the measured value is equal to or less than the threshold, the measured value is less the threshold, or the measured value satisfies another condition relative to the threshold), and may detect the touch event when the measured value satisfies the threshold (e.g., the measured value is equal to or greater than the threshold, the measured value is greater than the threshold, or the measured value satisfies another condition relative to the threshold).

The comparator circuit 302 is configured to make a touch/no-touch decision based on the comparison result. The comparator circuit 302 may transmit a decision output signal that is indicative of the touch/no-touch decision to the controller 303 that may be configured to perform additional actions or functions based on a result of the touch/no-touch decision.

As indicated above, FIG. 3 is provided as an example. Other examples may differ from what is described with regard to FIG. 3. The number and arrangement of components shown in FIG. 3 are provided as an example. In practice, the ultrasonic touch sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the ultrasonic touch sensor 300 may perform one or more functions described as being performed by another set of components of the ultrasonic touch sensor 300. In some implementations, the ultrasonic touch sensor 300 may be configured to target any ultrasonic reflected wave for measurement that undergoes a change in response to a touch event (e.g., a direct touch event or an indirect touch event) occurrent at the touch surface 104 or a change in response to a change in touch environment. Such a configuration would enable the ultrasonic touch sensor 300 flexibility to accommodate different types of touch structures, different types of touch gestures, and/or different types of touch environments.

Figure 4:
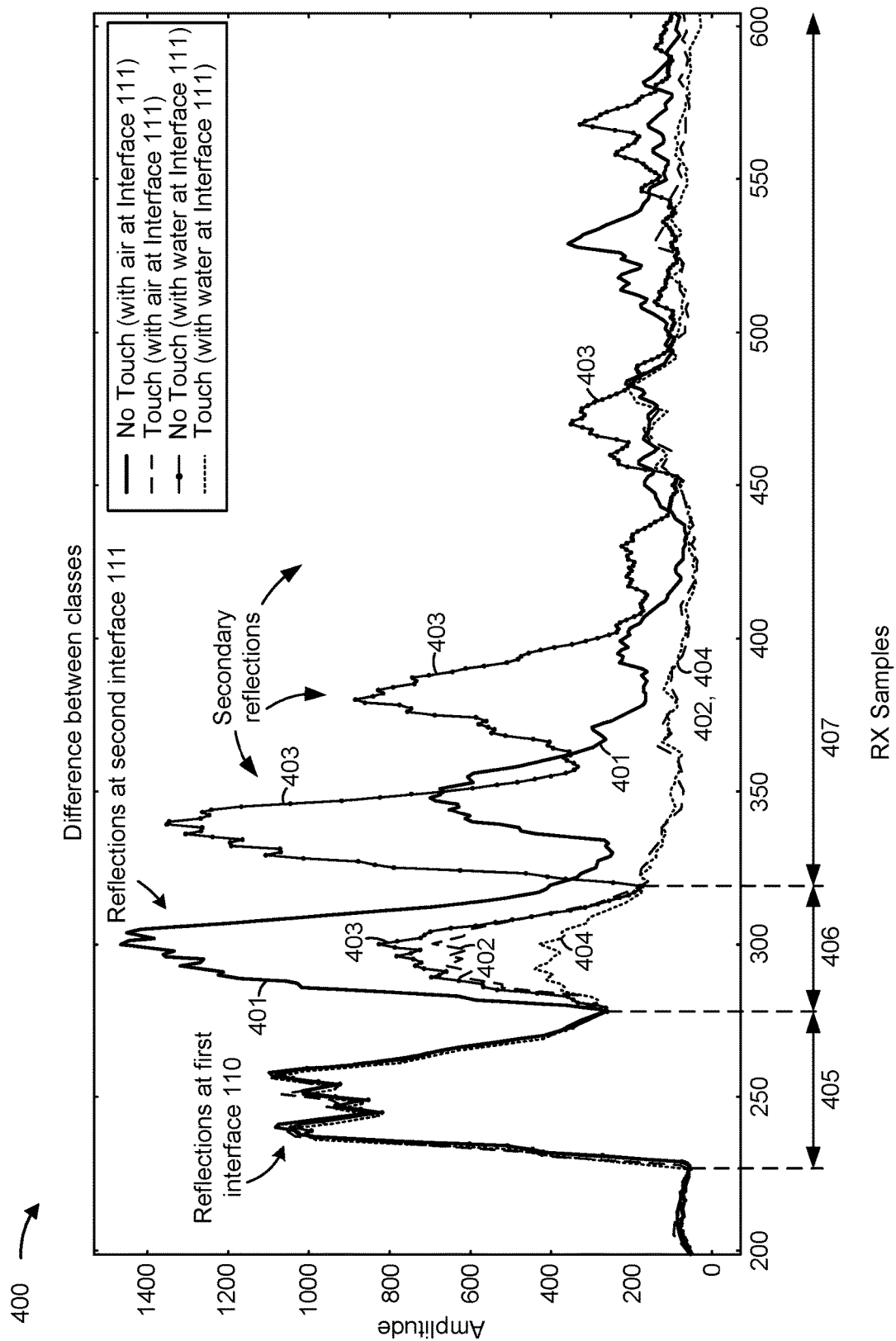
FIG. 4 illustrates a waveform diagram according to one or more implementations.

FIG. 4 illustrates a waveform diagram 400 according to one or more implementations. The waveform diagram 400 includes a no-touch response signal 401 with air present at the second interface 111 (e.g., at the touch surface 104), a touch response signal 402 with air present at the second interface 111, a no-touch response signal 403 with water present at the second interface 111, and a touch response signal 404 with water present at the second interface 111. The water present at the second interface 111 may be due to the touch surface 104 being submerged under water. The no-touch response signals 401 and 403 may be representative of an envelope of ultrasonic reflected waves produced by reflection of a respective ultrasonic transmit wave (e.g., the ultrasonic transmit wave 112) during a no-touch event and received by the receiver 106. The touch response signals 402 and 404 may be representative of an envelope of ultrasonic reflected waves produced by reflection of a respective ultrasonic transmit wave (e.g., the ultrasonic transmit wave 112) during a touch event and received by the receiver 106. In some implementations, the no-touch response signal 401 may be recorded while configuring an ultrasonic touch sensor (e.g., during a calibration operation) and may be used as a reference signal for making touch/no-touch decisions. The no-touch response signals 401 and 403 and the touch response signals 402 and 404 may be processed by the sensor circuit 107 as measurement signals (e.g., raw data). Thus, the waveform diagram 400A may illustrate a single excitation frame.

In addition, the waveform diagram 400 indicates various reflections at various interfaces of the ultrasonic touch sensor 300, including reflections produced at the first interface 110, reflections produced at the second interface 111, and secondary reflections. The reflections produced at the first interface 110, corresponding to the ultrasonic reflected wave 113, may be observed during a first observation window 405, during which the reflections from the first interface 110 are expected to be received by the receiver 106 (e.g., based on a time-of-flight principle).

The reflections produced at the second interface 111, corresponding to the ultrasonic reflected wave 114, may be observed during a second observation window 406, during which the reflections from the second interface 111 are expected to be received by the receiver 106 (e.g., based on a time-of-flight principle). The secondary reflections may be produced by the second interface 111 due to multiple internal reflections within the touch structure 102. Accordingly, the secondary reflections 115 may be received by the receiver 106 after being reflected back by the second interface 111. The secondary reflections may be observed during a third observation window 407, during which the secondary reflections from the second interface 111 are expected to be received by the receiver 106.

As noted above, the acoustic impedance change resulting from a touch event may be minimal at the first interface 110. As a result, the acoustic impedance change may not cause a measurable change in a property of the ultrasonic reflected wave 113. Thus, during the first observation window 405, the no-touch response signals and the touch response signals may be substantially similar to each other.

During the second observation window 406, there may be a measurable amplitude change between a no-touch response signal and a touch response signal that can be evaluated by the sensor circuit 107 for making a touch/no-touch decision. For example, an amplitude of the ultrasonic reflected wave 114 may be reduced during a touch event in comparison to a no-touch event. For example, in the second observation window 406, the touch response signal 402 has lower amplitude than the no-touch response signal 401. Additionally, in the second observation window 406, the touch response signal 404 has lower amplitude than the no-touch response signal 403. Thus, thresholding may be used to discriminate between no-touch and touch response signals of a same class (e.g., air response signals or water response signals). However, depending on a structure of the ultrasonic touch sensor 300 (e.g., types of materials used) and/or an environment, the touch response signal 402 could have an amplitude that is greater than or less than the no-touch response signal 403. Nevertheless, in the present example, thresholding with multiple threshold levels could be used to distinguish one type of response signal from the other types of response signals. For example, there is sufficient separation between the response signals 401-404 during the second observation window 406 to distinguish between the response signals 401 and 402 that occur in an air-environment from the response signals 403 and 404 that occur in an under-water-environment.

For example, while the ultrasonic touch sensor 300 is in the under-water-environment, the signal generator 304 may generate a first excitation signal in a first excitation frame for producing a first ultrasonic transmit wave. The transmitter 105 (e.g., a capacitive ultrasonic transmitter) may receive the first excitation signal and transmit the first ultrasonic transmit wave toward the touch structure 102 based on the first excitation signal while the touch surface 104 is submerged under water. The receiver 106 (e.g., a capacitive ultrasonic receiver) may receive a first ultrasonic reflected wave during the second observation window 406. Thus, the first ultrasonic reflected wave may be produced by a reflection of the first ultrasonic transmit wave at the second interface 111 while the touch surface 104 is submerged under the water, and generate a first measurement signal representative of the first ultrasonic reflected wave. The measurement circuit of the sensor circuit 107 may perform a first comparison based on the first measurement signal and a first threshold, and determine whether a no-touch event or a touch event has occurred at the touch surface 104 while the touch surface 104 is submerged under the water based on whether the first measurement signal satisfies the first threshold. The measurement circuit may detect the no-touch event when the first measurement signal does not satisfy the first threshold, and detect the touch event when the first measurement signal satisfies the first threshold.

In some implementations, the measurement circuit may measure a function of an amplitude of the first measurement signal to generate a measured value, detect the no-touch event when the measured value does not satisfy the first threshold, and detect the touch event when the measured value satisfies the first threshold. The measured value may be a global extremum of the first measurement signal measured within a predetermined measurement interval (e.g., within the second observation window 406), a maximum peak-to-peak amplitude of the first measurement signal measured within the predetermined measurement interval, an average amplitude of the first measurement signal measured within the predetermined measurement interval, or a median amplitude of the first measurement signal measured within the predetermined measurement interval.

In some implementations, the measurement circuit is configured to measure a function of an amplitude of the first measurement signal to generate a measured value, detect the no-touch event when a difference between the measured value and a reference value does not satisfy the first threshold, and detect the touch event when the difference satisfies the first threshold.

In some implementations, the measurement circuit is configured to calculate a distance (e.g., Euclidean distance, a squared Euclidian distance, a Chebyshev distance, a Manhattan distance, or a Minkowski distance) of the first measurement signal relative to a reference signal (e.g., the no-touch response signal 401 recorded during a configuring of the ultrasonic touch sensor 300) to generate a measured value, detect the no-touch event when the measured value does not satisfy the first threshold, and detect the touch event when the measured value satisfies the first threshold.

In some implementations, the measurement circuit may monitor for a signal change of the measurement signal during a predetermined time interval corresponding to the first ultrasonic reflected wave. The predetermined time interval may correspond to the second observation window 406, or a time interval corresponding to a secondary reflection. For example, during the second observation window 406, there is a significant change between the no-touch response signal 403 and the touch response signal 404. The measurement circuit may monitor the measurement signal for a signal change, determine whether a no-touch event or a touch event has occurred at the touch surface 104 while the touch surface 104 is submerged under the water based on whether the signal change is detected during the predetermined time interval (e.g., during the predetermined time interval with the second observation window 406). Significant signal changes between the no-touch response signal 403 and the touch response signal 404 may also occur with respect to the secondary reflections. Thus, the predetermined time interval may also correspond to a time interval during which a secondary reflection is expected to occur. Thus, the measurement circuit may to detect the touch event based on detecting the signal change during the predetermined time interval in the third observation window 407.

In some implementations, the signal change may be an oscillation with at least one peak-to-peak amplitude exceeding a threshold. In some implementations, the signal change may be an oscillation with a plurality of peak-to-peak amplitudes exceeding a threshold (e.g., every peak-to-peak amplitude of the plurality of peak-to-peak amplitudes exceeds the threshold). In some implementations, the signal change is a decrease in amplitude below a threshold, such as in the second observation window 406. In some implementations, the signal change is an increase in amplitude above a threshold, such as in the third observation window 407 corresponding to a secondary reflection.

An underwater touch may be a direct touch with skin contact or an indirect touch made with indirect contact. For example, the underwater touch may be an indirect touch made at the touch surface 104, where the indirect touch is a non-skin contact with a material, such as a glove.

While the ultrasonic touch sensor 300 is in the air-environment, the signal generator 304 may generate a second excitation signal in a second excitation frame for producing a second ultrasonic transmit wave. The transmitter 105 may receive the second excitation signal and transmit the second ultrasonic transmit wave toward the touch structure 102 based on the second excitation signal while the touch surface 104 is exposed to air. The receiver 106 may receive a second ultrasonic reflected wave during the second observation window 406. Thus, the second ultrasonic reflected wave may be produced by a reflection of the second ultrasonic transmit wave at the second interface 111 while the touch surface 104 is exposed to the air, and generate a second measurement signal representative of the second ultrasonic reflected wave. The measurement circuit of the sensor circuit 107 may perform a second comparison based on the second measurement signal and a second threshold, and determine whether the no-touch event or the touch event has occurred at the touch surface 104 while the touch surface 104 is exposed to the air based on whether the second measurement signal satisfies the second threshold. The measurement circuit may detect the no-touch event when the second measurement signal does not satisfy the second threshold, and detect the touch event when the second measurement signal satisfies the second threshold.

The second threshold may be different than the first threshold such that the touch response signals 402 and 404 can be distinguished from each other. For example, the second threshold may be greater than the first threshold. Thus, when a measurement signal is less than the second threshold but greater than the first threshold, the measurement circuit may determine that the touch event occurred in the air-environment. When a measurement signal is less than the first threshold, the measurement circuit may determine that the touch event occurred in the under-water-environment.

As indicated above, FIG. 4 is provided as an example. Other examples may differ from what is described with regard to FIG. 4.

Figure 5:
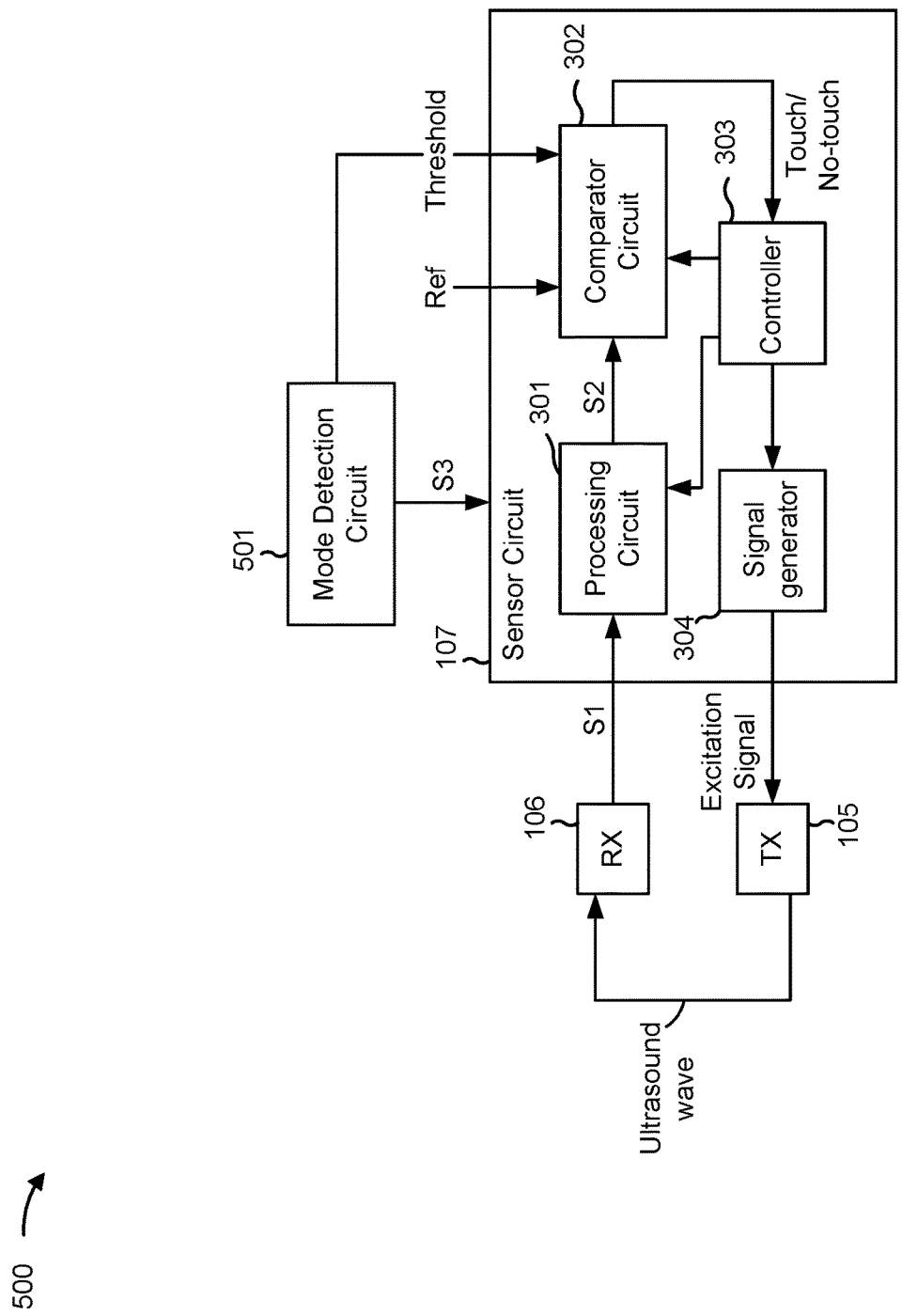
FIG. 5 illustrates a schematic block diagram of an ultrasonic touch sensor according to one or more implementations.

FIG. 5 illustrates a schematic block diagram of an ultrasonic touch sensor 500 according to one or more implementations. The ultrasonic touch sensor 500 is similar to the ultrasonic touch sensor 300 described above in conjunction with FIG. 3, with the exception that the ultrasonic touch sensor 500 includes a mode detection circuit 501. The mode detection circuit 501 may analyze a surrounding environment of the ultrasonic touch sensor 500 and determine whether the surrounding environment is an air environment or a water environment. Additionally, the mode detection circuit 501 may configure the ultrasonic touch sensor 500 into a first operation mode based on a first condition that the air environment is detected and configure the ultrasonic touch sensor 500 into a second operation mode based on a second condition that the water environment is detected. For example, the mode detection circuit 501 may set the threshold provided to the comparator circuit 302 to a first threshold for the first operation mode (e.g., for the air environment) or may set the threshold provided to the comparator circuit 302 to a second threshold for the second operation mode (e.g., for the water environment), with the first threshold and the second threshold being different thresholds (e.g., different threshold values). For example, the second threshold may be less than the first threshold.

Thus, the measurement circuit, including the processing circuit 301 and the comparator circuit 302, may receive the measurement signal S1 from the receiver 106, and make a touch/no-touch decision based on an operation mode set by the mode detection circuit 501. For example, wherein, while configured in the first operation mode, the measurement circuit may perform a first comparison based on the measurement signal S1 and the first threshold, and determine whether a no-touch event or a touch event has occurred at the touch surface based on whether the measurement signal S1 satisfies the first threshold (e.g., based on whether the measured value S2 satisfies the first threshold). Alternatively, while configured in the second operation mode, the measurement circuit may perform a second comparison based on the measurement signal S1 and a second threshold and determine whether the no-touch event or the touch event has occurred at the touch surface based on whether the measurement signal S1 satisfies the second threshold (e.g., based on whether the measured value S2 satisfies the second threshold).

In some implementations, while configured the second operation mode, the measurement circuit may measure a function of an amplitude of the measurement signal S1 to generate the measured value S2, detect the no-touch event when the measured value S2 does not satisfy the second threshold, and detect the touch event when the measured value S2 satisfies the second threshold. In some implementations, while configured in the second operation mode, the measurement circuit may measure a function of an amplitude of the measurement signal S1 to generate the measured value S2, detect the no-touch event when a difference between the measured value S2 and a reference value Ref does not satisfy the second threshold, and detect the touch event when the difference satisfies the second threshold. In some implementations, while configured in the second operation mode, the measurement circuit may calculate a distance of the measurement signal S1 relative to a reference signal (e.g., the no-touch response signal 401 recorded during a configuring of the ultrasonic touch sensor 500) to generate the measured value S2, detect the no-touch event when the measured value S2 does not satisfy the second threshold, and detect the touch event when the measured value S2 satisfies the second threshold.

In some implementations, the mode detection circuit 501 may include one or more auxiliary capacitive ultrasonic transducers arranged within the ultrasound chamber 103 to analyze the surrounding environment. In addition, the mode detection circuit 501 may have an auxiliary processing circuit or may use the processing circuit 301 to analyze the surrounding environment based on auxiliary measurement signals generated by the one or more auxiliary capacitive ultrasonic transducers.

For example, the mode detection circuit 501 may include an auxiliary capacitive ultrasonic transmitter and an auxiliary capacitive ultrasonic receiver arranged within the ultrasound chamber 103. The auxiliary capacitive ultrasonic transmitter and the auxiliary capacitive ultrasonic receiver may be part of the array of transceiver transducers 200. The auxiliary capacitive ultrasonic transmitter may transmit an auxiliary ultrasonic transmit wave toward the touch structure 102. The auxiliary capacitive ultrasonic receiver may receive an auxiliary ultrasonic reflected wave produced by a reflection of the auxiliary ultrasonic transmit wave at the touch structure 102 and generate an auxiliary measurement signal S3 representative of the auxiliary ultrasonic reflected wave. The processing circuit of the mode detection circuit may receive the auxiliary measurement signal S3 and determine whether the surrounding environment is the air environment or the water environment based on the auxiliary measurement signal S3.

The mode detection circuit 501 may monitor an amplitude of the auxiliary measurement signal S3 over a plurality of excitation frames, determine that the surrounding environment is the air environment based on a third condition that the amplitude of the auxiliary measurement signal S3 remains within a first threshold range over the plurality of excitation frames, and determine that the surrounding environment is the water environment based on a fourth condition that the amplitude of the auxiliary measurement signal S3 remains within a second threshold range over the plurality of excitation frames. For example, an amplitude of the no-touch response signal 401 during the second observation window 406 may be clearly separated from an amplitude of the no-touch response signal 403 during the second observation window 406. Thus, the amplitude of the no-touch response signal 401 during the second observation window 406 may be located in the first threshold range, whereas the amplitude of the no-touch response signal 403 during the second observation window 406 may be located in the second threshold range. As a result, the first threshold range and the second threshold range are mutually exclusive.

Since touch events are typically short (e.g., generally occurring in a single excitation frame), and non-touch events are typically long (e.g., generally occurring over two or more excitation frames), non-touch events should be predominant over the plurality of excitation frames. Thus, the mode detection circuit 501 may monitor an amplitude of the auxiliary measurement signal S3 over the plurality of excitation frames to determine whether the no-touch response signal 401 or the no-touch response signal 403 is present based on whether the amplitude of the auxiliary measurement signal S3 remains within the first threshold range or the second threshold range over the plurality of excitation frames. In some implementations, the mode detection circuit 501 may include a finite state machine to analyze the auxiliary measurement signal S3 over the plurality of excitation frames.

As indicated above, FIG. 5 is provided as an example. Other examples may differ from what is described with regard to FIG. 5.

Figure 6:
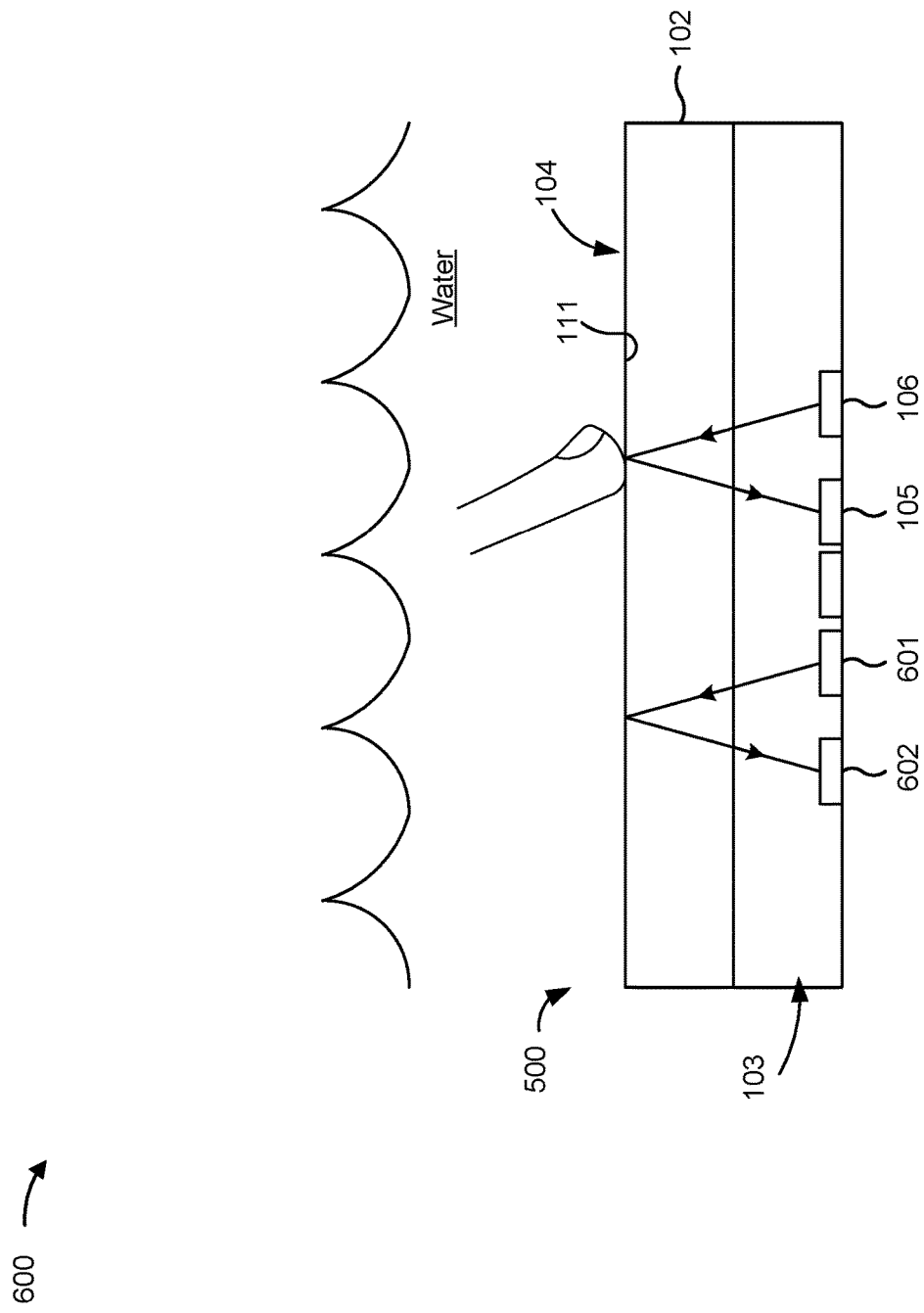
FIG. 6 illustrates a diagram of an ultrasonic touch sensor in a water environment according to one or more implementations.

FIG. 6 illustrates a diagram 600 of an ultrasonic touch sensor in a water environment according to one or more implementations. The ultrasonic touch sensor may be similar to the ultrasonic touch sensor 500 described in connection with FIG. 5. For example, the ultrasonic touch sensor 500 may include the transmitter 105 and the receiver 106 that are used for detecting touch and no-touch events. In addition, the ultrasonic touch sensor 500 may include an auxiliary capacitive ultrasonic transmitter 601 and an auxiliary capacitive ultrasonic receiver 602 that are used by the mode detection circuit 501 for determining the surrounding environment the ultrasonic touch sensor 500, as described above in connection with FIG. 5.

As indicated above, FIG. 6 is provided as an example. Other examples may differ from what is described with regard to FIG. 6.

Figure 7:
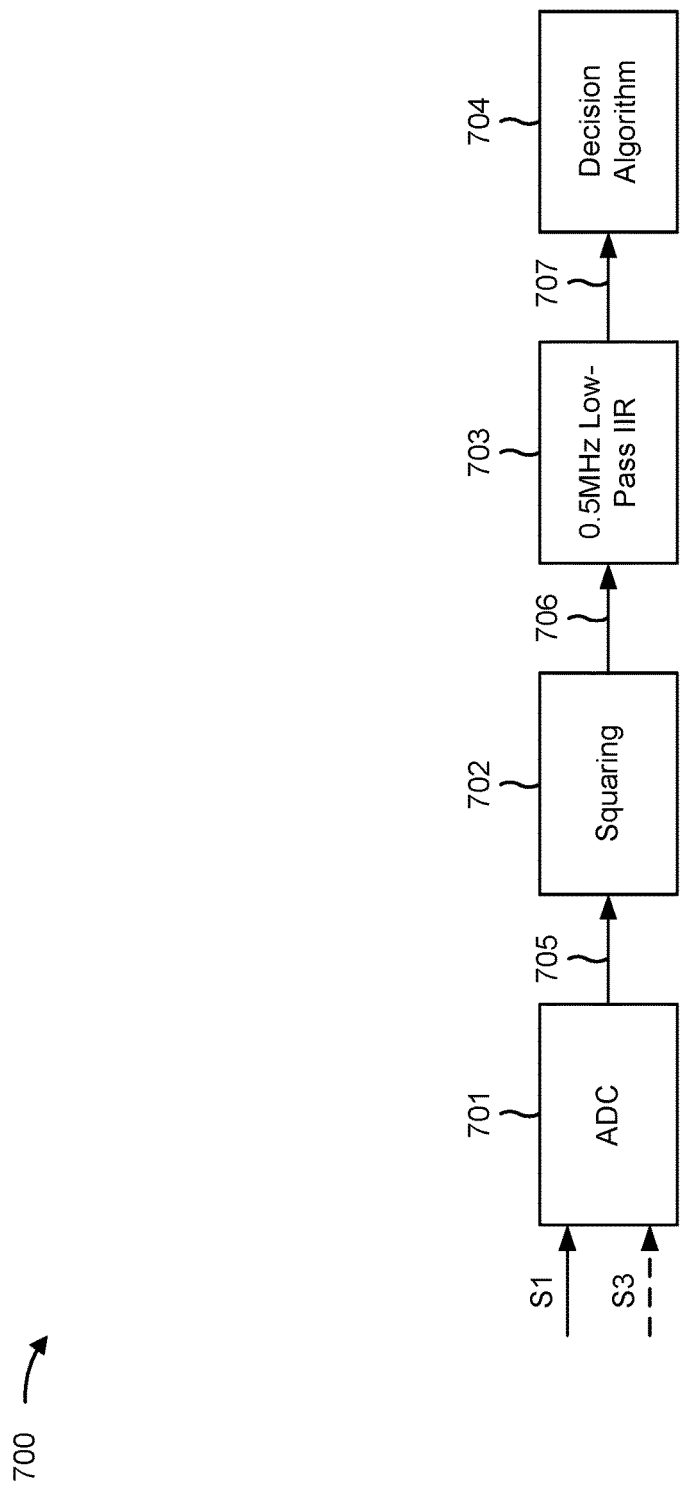
FIG. 7 illustrates a schematic block diagram of a measurement circuit according to one or more implementations.

FIG. 7 illustrates a schematic block diagram of a measurement circuit 700 according to one or more implementations. The measurement circuit 700 may include an ADC 701, a squaring circuit 702, a low-pass infinite impulse response (IIR) filter 703, and a comparison circuit 704. The ADC 701, the squaring circuit 702, and the low-pass IIR filter 703 may be provided in the processing circuit 301, whereas the comparison circuit 704 may include the comparator circuit 302.

The ADC 701 may receive the measurement signal S1 and convert the measurement signal S1 into a digital measurement signal 705. The squaring circuit 702 may perform a squaring function on the digital measurement signal 705 to generate a rectified signal 706. The low-pass IIR filter 703 may receive the rectified signal 706 and generate an output signal 707. The low-pass IIR filter 703 may have a cut-off frequency of 0.5 MHz. The output of the low-pass IIR filter 703 may be similar to one of the response signals 401-404 shown in the waveform diagram 400.

In some implementations, the output signal 707 may represent the measured value S2. The comparison circuit 704 may compare the output signal with the first threshold or with the second threshold to determine whether the no-touch event or the touch event has occurred at the touch surface 104 based on the first operation mode or the second operation mode, respectively.

In some implementations, the measure value S2 may be generated by the comparison circuit 704 from the output signal 707. For example, the comparison circuit 704 may calculate a distance of the output signal 707 relative to a reference signal (e.g., the no-touch response signal 401 recorded during a configuring of the ultrasonic touch sensor 500) to generate the measured value S2, compare the measured value S2 with the first threshold or with the second threshold based on the first operation mode or the second operation mode, respectively, to generate a comparison result, and determine whether the no-touch event or the touch event has occurred based on the comparison result.

The ADC 701 may also be configured to receive the auxiliary measurement signal S3, and the comparison circuit 704 may monitor the amplitude of the auxiliary measurement signal S3 over the plurality of excitation frames to determine that the surrounding environment is the air environment or the water environment.

As indicated above, FIG. 7 is provided as an example. Other examples may differ from what is described with regard to FIG. 7.

Figure 8:
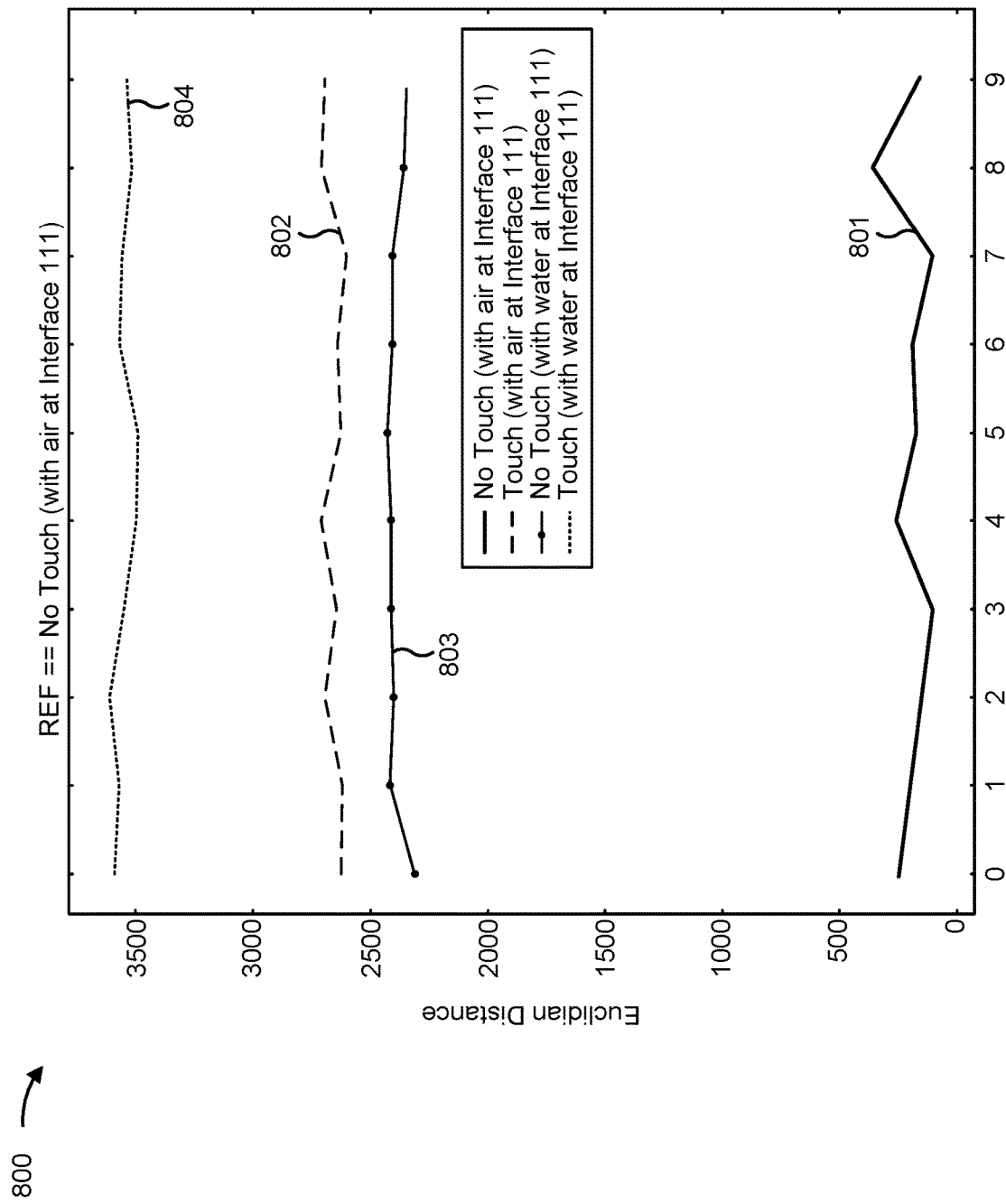
FIG. 8 illustrates a waveform diagram according to one or more implementations.

FIG. 8 illustrates a waveform diagram 800 according to one or more implementations. The waveform diagram 800 includes Euclidean distance signals 801-804 generated by the measurement circuit. The Euclidean distance signal 801 may be representative of a Euclidean distance of the no-touch response signal 401 to the reference signal (e.g., the no-touch response signal 401 recorded during a configuring of the ultrasonic touch sensor). Since the no-touch response signal 401 measured during operation should be similar to the no-touch response signal 401 recorded during a configuring, the Euclidean distance is small. The Euclidean distance signal 802 may be representative of the Euclidean distance of the touch response signal 402 to the reference signal. The Euclidean distance signal 803 may be representative of the Euclidean distance of the no-touch response signal 403 to the reference signal. The Euclidean distance signal 804 may be representative of the Euclidean distance of the touch response signal 404 to the reference signal. Thus, one or more thresholds may be used by measurement circuit to determine whether a Euclidean distance signal corresponds to a touch or no-touch response signal. In some implementations, the mode detection circuit 501 may be used to set a threshold.

As indicated above, FIG. 8 is provided as an example. Other examples may differ from what is described with regard to FIG. 8.

Figure 9:
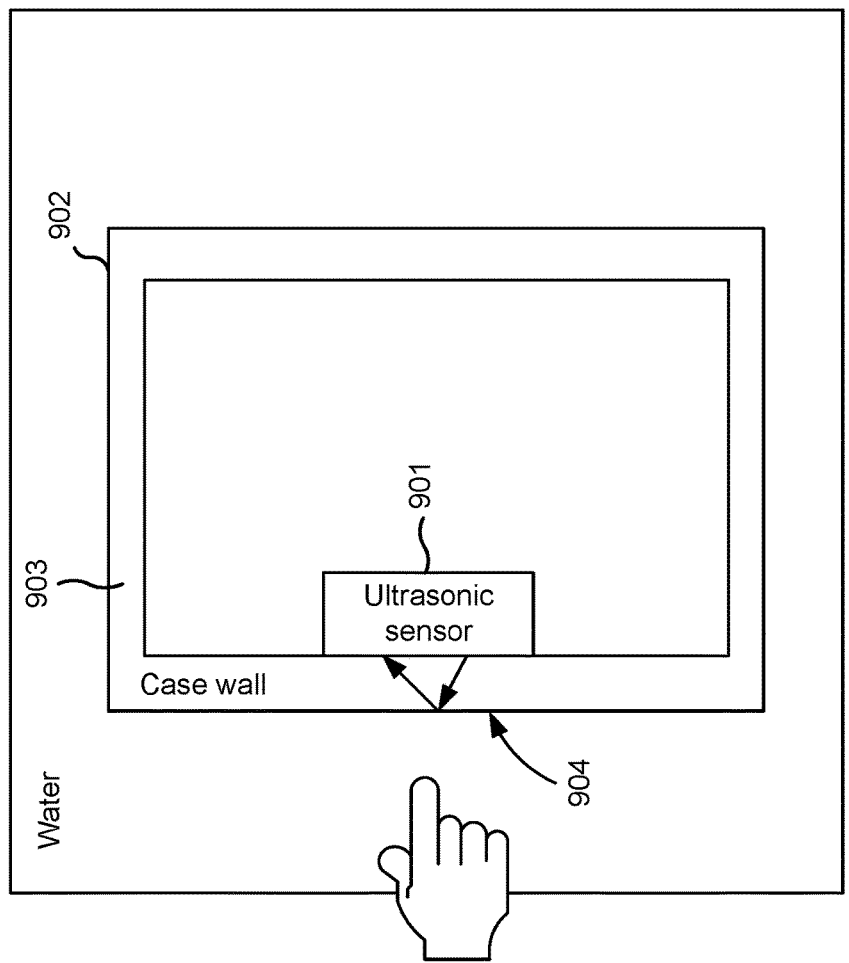
FIG. 9 illustrates a device according to one or more implementation.

FIG. 9 illustrates a device 900 according to one or more implementation. The device 900 includes an ultrasonic touch sensor 901 that is placed inside a water-tight case 902. The water-tight case 902 may have a wall 903 that is implemented as a touch structure with a touch surface 904. The ultrasonic touch sensor 901 may have capacitive ultrasonic transducers facing outward toward the wall 903 of the water-tight case 902, thus enabling touch detection at the touch surface 904.

As indicated above, FIG. 9 is provided as an example. Other examples may differ from what is described with regard to FIG. 9.

The following provides an overview of some Aspects of the present disclosure:

Aspect 1: An ultrasonic touch sensor configured to be submerged under water, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate a first excitation signal for producing a first ultrasonic transmit wave; a capacitive ultrasonic transmitter arranged within the ultrasound chamber, wherein the capacitive ultrasonic transmitter is configured to receive the first excitation signal and transmit the first ultrasonic transmit wave toward the touch structure based on the first excitation signal while the touch surface is submerged under the water; a capacitive ultrasonic receiver arranged within the ultrasound chamber, wherein the capacitive ultrasonic receiver is configured to receive a first ultrasonic reflected wave produced by a reflection of the first ultrasonic transmit wave at the touch interface while the touch surface is submerged under the water and generate a first measurement signal representative of the first ultrasonic reflected wave; and a measurement circuit coupled to the capacitive ultrasonic receiver and configured to perform a first comparison based on the first measurement signal and a first threshold, and determine whether a no-touch event or a touch event has occurred at the touch surface while the touch surface is submerged under the water based on whether the first measurement signal satisfies the first threshold.

Aspect 2: The ultrasonic touch sensor of Aspect 1, wherein the signal generator is configured to generate a second excitation signal for producing a second ultrasonic transmit wave, wherein the capacitive ultrasonic transmitter is configured to receive the second excitation signal and transmit the second ultrasonic transmit wave toward the touch structure based on the second excitation signal while the touch surface is exposed to air; wherein the capacitive ultrasonic receiver is configured to receive a second ultrasonic reflected wave produced by a reflection of the second ultrasonic transmit wave at the touch interface while the touch surface is exposed to the air and generate a second measurement signal representative of the second ultrasonic reflected wave, and wherein the measurement circuit is configured to perform a second comparison based on the second measurement signal and a second threshold, and determine whether the no-touch event or the touch event has occurred at the touch surface while the touch surface is exposed to the air based on whether the second measurement signal satisfies the second threshold, wherein the second threshold is different than the first threshold. wherein the capacitive ultrasonic transmitter is configured to receive the second excitation signal and transmit the second ultrasonic transmit wave toward the touch structure based on the second excitation signal while the touch surface is exposed to air; wherein the capacitive ultrasonic receiver is configured to receive a second ultrasonic reflected wave produced by a reflection of the second ultrasonic transmit wave at the touch interface while the touch surface is exposed to the air and generate a second measurement signal representative of the second ultrasonic reflected wave, and wherein the measurement circuit is configured to perform a second comparison based on the second measurement signal and a second threshold, and determine whether the no-touch event or the touch event has occurred at the touch surface while the touch surface is exposed to the air based on whether the second measurement signal satisfies the second threshold, wherein the second threshold is different than the first threshold.

Aspect 3: The ultrasonic touch sensor of Aspect 2, wherein the second threshold is greater than the first threshold.

Aspect 4: The ultrasonic touch sensor of any of Aspects 1-3, wherein the measurement circuit is configured to detect the no-touch event when the first measurement signal does not satisfy the first threshold, and detect the touch event when the first measurement signal satisfies the first threshold.

Aspect 5: The ultrasonic touch sensor of any of Aspects 1-4, wherein the measurement circuit is configured to measure a function of an amplitude of the first measurement signal to generate a measured value, detect the no-touch event when the measured value does not satisfy the first threshold, and detect the touch event when the measured value satisfies the first threshold.

Aspect 6: The ultrasonic touch sensor of Aspect 5, wherein the measured value is a global extremum of the first measurement signal measured within a predetermined measurement interval, a maximum peak-to-peak amplitude of the first measurement signal measured within the predetermined measurement interval, an average amplitude of the first measurement signal measured within the predetermined measurement interval, or a median amplitude of the first measurement signal measured within the predetermined measurement interval.

Aspect 7: The ultrasonic touch sensor of any of Aspects 1-6, wherein the measurement circuit is configured to measure a function of an amplitude of the first measurement signal to generate a measured value, detect the no-touch event when a difference between the measured value and a reference value does not satisfy the first threshold, and detect the touch event when the difference satisfies the first threshold.

Aspect 8: The ultrasonic touch sensor of any of Aspects 1-7, wherein the measurement circuit is configured to calculate a distance of the first measurement signal relative to a reference signal to generate a measured value, detect the no-touch event when the measured value does not satisfy the first threshold, and detect the touch event when the measured value satisfies the first threshold.

Aspect 9: The ultrasonic touch sensor of Aspect 8, wherein the distance is an Euclidean distance, a squared Euclidian distance, a Chebysev distance, a Manhattan distance, or a Minkowski distance.

Aspect 10: An ultrasonic touch sensor, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal; a capacitive ultrasonic receiver arranged within the ultrasound chamber, wherein the capacitive ultrasonic receiver is configured to receive an ultrasonic reflected wave produced by a reflection of the ultrasonic transmit wave at the touch structure and generate a measurement signal representative of the ultrasonic reflected wave; a mode detection circuit configured to analyze a surrounding environment of the ultrasonic touch sensor and determine whether the surrounding environment is an air environment or a water environment, wherein the mode detection circuit is configured to configure the ultrasonic touch sensor into a first operation mode based on a first condition the air environment is detected and configure the ultrasonic touch sensor into a second operation mode based on a second condition the water environment is detected; and a measurement circuit coupled to the capacitive ultrasonic receiver for receiving the measurement signal, wherein, while configured in the first operation mode, the measurement circuit is configured to perform a first comparison based on the measurement signal and a first threshold and determine whether a no-touch event or a touch event has occurred at the touch surface based on whether the measurement signal satisfies the first threshold, wherein, while configured in the second operation mode, the measurement circuit is configured to perform a second comparison based on the measurement signal and a second threshold and determine whether the no-touch event or the touch event has occurred at the touch surface based on whether the measurement signal satisfies the second threshold, and wherein the first threshold and the second threshold are different thresholds.

Aspect 11: The ultrasonic touch sensor of Aspect 10, wherein the second threshold is less than the first threshold.

Aspect 12: The ultrasonic touch sensor of any of Aspects 10-11, wherein, while configured in the second operation mode, the measurement circuit is configured to measure a function of an amplitude of the measurement signal to generate a measured value, detect the no-touch event when the measured value does not satisfy the second threshold, and detect the touch event when the measured value satisfies the second threshold.

Aspect 13: The ultrasonic touch sensor of any of Aspects 10-12, wherein, while configured in the second operation mode, the measurement circuit is configured to measure a function of an amplitude of the measurement signal to generate a measured value, detect the no-touch event when a difference between the measured value and a reference value does not satisfy the second threshold, and detect the touch event when the difference satisfies the second threshold.

Aspect 14: The ultrasonic touch sensor of any of Aspects 10-13, wherein, while configured in the second operation mode, the measurement circuit is configured to calculate a distance of the measurement signal relative to a reference signal to generate a measured value, detect the no-touch event when the measured value does not satisfy the second threshold, and detect the touch event when the measured value satisfies the second threshold.

Aspect 15: The ultrasonic touch sensor of any of Aspects 10-14, further comprising: an auxiliary capacitive ultrasonic transmitter arranged within the ultrasound chamber, wherein the auxiliary capacitive ultrasonic transmitter is configured to transmit an auxiliary ultrasonic transmit wave toward the touch structure; and an auxiliary capacitive ultrasonic receiver arranged within the ultrasound chamber, wherein the auxiliary capacitive ultrasonic receiver is configured to receive an auxiliary ultrasonic reflected wave produced by a reflection of the auxiliary ultrasonic transmit wave at the touch structure and generate an auxiliary measurement signal representative of the auxiliary ultrasonic reflected wave, wherein the mode detection circuit is configured to receive the auxiliary measurement signal and determine whether the surrounding environment is the air environment or the water environment based on the auxiliary measurement signal.

Aspect 16: The ultrasonic touch sensor of Aspect 15, wherein the mode detection circuit is configured to monitor an amplitude of the auxiliary measurement signal over a plurality of excitation frames, determine that the surrounding environment is the air environment based on a third condition that the amplitude of the auxiliary measurement signal remains within a first threshold range over the plurality of excitation frames, and determine that the surrounding environment is the water environment based on a fourth condition that the amplitude of the auxiliary measurement signal remains within a second threshold range over the plurality of excitation frames.

Aspect 17: The ultrasonic touch sensor of Aspect 16, wherein the mode detection circuit includes a finite state machine.

Aspect 18: The ultrasonic touch sensor of Aspect 16, wherein the first threshold range and the second threshold range are mutually exclusive.

Aspect 19: The ultrasonic touch sensor of Aspect 15, wherein the mode detection circuit is configured to monitor an amplitude of the auxiliary measurement signal, determine that the surrounding environment is the air environment based on a third condition that the amplitude of the auxiliary measurement signal remains within a first threshold range for a first respective duration that satisfies a time threshold, and determine that the surrounding environment is the water environment based on a fourth condition that the amplitude of the auxiliary measurement signal remains within a second threshold range for a second respective that satisfies the time threshold.

Aspect 20: The ultrasonic touch sensor of any of Aspects 10-19, wherein the measurement circuit comprises: an analog-to-digital converter (ADC) configured to receive the measurement signal and convert the measurement signal into a digital measurement signal; a squaring circuit configured to perform a squaring function on the digital measurement signal to generate a rectified signal; a low-pass infinite impulse response (IIR) filter configured to receive the rectified signal and generate an output signal; and a comparison circuit configured to compare the output signal with the first threshold or the second threshold to determine whether the no-touch event or the touch event has occurred at the touch surface based on the first operation mode or the second operation mode, respectively.

Aspect 21: The ultrasonic touch sensor of any of Aspects 10-20, wherein the measurement circuit comprises: an analog-to-digital converter (ADC) configured to receive the measurement signal and convert the measurement signal into a digital measurement signal; a squaring circuit configured to perform a squaring function on the digital measurement signal to generate a rectified signal; a low-pass infinite impulse response (IIR) filter configured to receive the rectified signal and generate an output signal; and a comparison circuit configured to calculate a distance of the output signal relative to a reference signal to generate a measured value, compare the measured value with the first threshold or the second threshold based on the first operation mode or the second operation mode, respectively, to generate a comparison result, and determine whether the no-touch event or the touch event has occurred based on the comparison result.

Aspect 22: An ultrasonic touch sensor configured to be submerged under water, comprising: a housing having an ultrasound chamber; a touch structure comprising a touch surface configured to receive a touch, wherein the touch structure is coupled to the housing and arranged over the ultrasound chamber, and wherein the touch structure comprises a touch interface at the touch surface; a signal generator configured to generate an excitation signal for producing an ultrasonic transmit wave; a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal while the touch surface is submerged under the water; a capacitive ultrasonic receiver arranged within the ultrasound chamber, wherein the capacitive ultrasonic receiver is configured to receive an ultrasonic reflected wave produced by a reflection of the ultrasonic transmit wave at the touch interface while the touch surface is submerged under the water and generate a measurement signal representative of the ultrasonic reflected wave; and a measurement circuit coupled to the capacitive ultrasonic receiver and configured to monitor for a signal change of the measurement signal during a predetermined time interval corresponding to the ultrasonic reflected wave, and determine whether a no-touch event or a touch event has occurred at the touch surface while the touch surface is submerged under the water based on whether the signal change is detected during the predetermined time interval.

Aspect 23: The ultrasonic touch sensor of Aspect 22, wherein the measurement circuit is configured to detect the touch event based on detecting the signal change during the predetermined time interval.

Aspect 24: The ultrasonic touch sensor of any of Aspects 22-23, wherein the signal change is an oscillation with at least one peak-to-peak amplitude exceeding a threshold.

Aspect 25: The ultrasonic touch sensor of any of Aspects 22-24, wherein the signal change is an oscillation with a plurality of peak-to-peak amplitudes exceeding a threshold.

Aspect 26: The ultrasonic touch sensor of any of Aspects 22-25, wherein the touch is an indirect touch made at the touch surface, wherein the indirect touch is a non-skin contact with a material.

Aspect 27: The ultrasonic touch sensor of any of Aspects 22-26, wherein the signal change is a decrease in amplitude below a threshold.

Aspect 28: A system configured to perform one or more operations recited in one or more of Aspects 1-27.

Aspect 29: An apparatus comprising means for performing one or more operations recited in one or more of Aspects 1-27.

Aspect 30: A non-transitory computer-readable medium storing a set of instructions, the set of instructions comprising one or more instructions that, when executed by a device, cause the device to perform one or more operations recited in one or more of Aspects 1-27.

Aspect 31: A computer program product comprising instructions or code for executing one or more operations recited in one or more of Aspects 1-27.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An ultrasonic touch sensor configured to be submerged under water, comprising:
 a housing having an ultrasound chamber;
 a touch structure comprising a touch surface configured to receive a touch, wherein the touch structure is coupled to the housing and arranged over the ultrasound chamber, and wherein the touch structure comprises a touch interface at the touch surface;
 a signal generator configured to generate a first excitation signal for producing a first ultrasonic transmit wave;
 a capacitive ultrasonic transmitter arranged within the ultrasound chamber, wherein the capacitive ultrasonic transmitter is configured to receive the first excitation signal and transmit the first ultrasonic transmit wave toward the touch structure based on the first excitation signal while the touch surface is submerged under the water;
 a capacitive ultrasonic receiver arranged within the ultrasound chamber, wherein the capacitive ultrasonic receiver is configured to receive a first ultrasonic reflected wave produced by a reflection of the first ultrasonic transmit wave at the touch interface while the touch surface is submerged under the water and generate a first measurement signal representative of the first ultrasonic reflected wave; and
 a measurement circuit coupled to the capacitive ultrasonic receiver and configured to perform a first comparison based on the first measurement signal and a first threshold, and determine whether a no-touch event or a touch event has occurred at the touch surface while the touch surface is submerged under the water based on whether the first measurement signal satisfies the first threshold.

2. The ultrasonic touch sensor of claim 1, wherein the signal generator is configured to generate a second excitation signal for producing a second ultrasonic transmit wave,
 wherein the capacitive ultrasonic transmitter is configured to receive the second excitation signal and transmit the second ultrasonic transmit wave toward the touch structure based on the second excitation signal while the touch surface is exposed to air;
 wherein the capacitive ultrasonic receiver is configured to receive a second ultrasonic reflected wave produced by a reflection of the second ultrasonic transmit wave at the touch interface while the touch surface is exposed to the air and generate a second measurement signal representative of the second ultrasonic reflected wave, and
 wherein the measurement circuit is configured to perform a second comparison based on the second measurement signal and a second threshold, and determine whether the no-touch event or the touch event has occurred at the touch surface while the touch surface is exposed to the air based on whether the second measurement signal satisfies the second threshold, wherein the second threshold is different than the first threshold.

3. The ultrasonic touch sensor of claim 2, wherein the second threshold is greater than the first threshold.

4. The ultrasonic touch sensor of claim 1, wherein the measurement circuit is configured to detect the no-touch event when the first measurement signal does not satisfy the first threshold, and detect the touch event when the first measurement signal satisfies the first threshold.

5. The ultrasonic touch sensor of claim 1, wherein the measurement circuit is configured to measure a function of an amplitude of the first measurement signal to generate a measured value, detect the no-touch event when the measured value does not satisfy the first threshold, and detect the touch event when the measured value satisfies the first threshold.

6. The ultrasonic touch sensor of claim 5, wherein the measured value is a global extremum of the first measurement signal measured within a predetermined measurement interval, a maximum peak-to-peak amplitude of the first measurement signal measured within the predetermined measurement interval, an average amplitude of the first measurement signal measured within the predetermined measurement interval, or a median amplitude of the first measurement signal measured within the predetermined measurement interval.

7. The ultrasonic touch sensor of claim 1, wherein the measurement circuit is configured to measure a function of an amplitude of the first measurement signal to generate a measured value, detect the no-touch event when a difference between the measured value and a reference value does not satisfy the first threshold, and detect the touch event when the difference satisfies the first threshold.

8. The ultrasonic touch sensor of claim 1, wherein the measurement circuit is configured to calculate a distance of the first measurement signal relative to a reference signal to generate a measured value, detect the no-touch event when the measured value does not satisfy the first threshold, and detect the touch event when the measured value satisfies the first threshold.

9. The ultrasonic touch sensor of claim 8, wherein the distance is a Euclidean distance, a squared Euclidian distance, a Chebyshev distance, a Manhattan distance, or a Minkowski distance.

10. An ultrasonic touch sensor, comprising:
 a housing having an ultrasound chamber;
 a touch structure comprising a touch surface configured to receive a touch, wherein the touch structure is coupled to the housing and arranged over the ultrasound chamber, and wherein the touch structure comprises a touch interface at the touch surface;
 a signal generator configured to generate an excitation signal for producing an ultrasonic transmit wave;
 a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal;
 a capacitive ultrasonic receiver arranged within the ultrasound chamber, wherein the capacitive ultrasonic receiver is configured to receive an ultrasonic reflected wave produced by a reflection of the ultrasonic transmit wave at the touch structure and generate a measurement signal representative of the ultrasonic reflected wave;

a mode detection circuit configured to analyze a surrounding environment of the ultrasonic touch sensor and determine whether the surrounding environment is an air environment or a water environment, wherein the mode detection circuit is configured to configure the ultrasonic touch sensor into a first operation mode based on a first condition that the air environment is detected and configure the ultrasonic touch sensor into a second operation mode based on a second condition that the water environment is detected; and a measurement circuit coupled to the capacitive ultrasonic receiver for receiving the measurement signal, wherein, while configured in the first operation mode, the measurement circuit is configured to perform a first comparison based on the measurement signal and a first threshold and determine whether a no-touch event or a touch event has occurred at the touch surface based on whether the measurement signal satisfies the first threshold, wherein, while configured in the second operation mode, the measurement circuit is configured to perform a second comparison based on the measurement signal and a second threshold and determine whether the no-touch event or the touch event has occurred at the touch surface based on whether the measurement signal satisfies the second threshold, and wherein the first threshold and the second threshold are different thresholds.

11. The ultrasonic touch sensor of claim 10, wherein the second threshold is less than the first threshold.

12. The ultrasonic touch sensor of claim 10, wherein, while configured in the second operation mode, the measurement circuit is configured to measure a function of an amplitude of the measurement signal to generate a measured value, detect the no-touch event when the measured value does not satisfy the second threshold, and detect the touch event when the measured value satisfies the second threshold.

13. The ultrasonic touch sensor of claim 10, wherein, while configured in the second operation mode, the measurement circuit is configured to measure a function of an amplitude of the measurement signal to generate a measured value, detect the no-touch event when a difference between the measured value and a reference value does not satisfy the second threshold, and detect the touch event when the difference satisfies the second threshold.

14. The ultrasonic touch sensor of claim 10, wherein, while configured in the second operation mode, the measurement circuit is configured to calculate a distance of the measurement signal relative to a reference signal to generate a measured value, detect the no-touch event when the measured value does not satisfy the second threshold, and detect the touch event when the measured value satisfies the second threshold.

15. The ultrasonic touch sensor of claim 10, further comprising:

an auxiliary capacitive ultrasonic transmitter arranged within the ultrasound chamber, wherein the auxiliary capacitive ultrasonic transmitter is configured to transmit an auxiliary ultrasonic transmit wave toward the touch structure; and an auxiliary capacitive ultrasonic receiver arranged within the ultrasound chamber, wherein the auxiliary capacitive ultrasonic receiver is configured to receive an auxiliary ultrasonic reflected wave produced by a reflection of the auxiliary ultrasonic transmit wave at the touch structure and generate an auxiliary measurement signal representative of the auxiliary ultrasonic reflected wave, wherein the mode detection circuit is configured to receive the auxiliary measurement signal and determine whether the surrounding environment is the air environment or the water environment based on the auxiliary measurement signal.

16. The ultrasonic touch sensor of claim 15, wherein the mode detection circuit is configured to monitor an amplitude of the auxiliary measurement signal over a plurality of excitation frames, determine that the surrounding environment is the air environment based on a third condition that the amplitude of the auxiliary measurement signal remains within a first threshold range over the plurality of excitation frames, and determine that the surrounding environment is the water environment based on a fourth condition that the amplitude of the auxiliary measurement signal remains within a second threshold range over the plurality of excitation frames.

17. The ultrasonic touch sensor of claim 16, wherein the mode detection circuit includes a finite state machine.

18. The ultrasonic touch sensor of claim 16, wherein the first threshold range and the second threshold range are mutually exclusive.

19. The ultrasonic touch sensor of claim 15, wherein the mode detection circuit is configured to monitor an amplitude of the auxiliary measurement signal, determine that the surrounding environment is the air environment based on a third condition that the amplitude of the auxiliary measurement signal remains within a first threshold range for a first respective duration that satisfies a time threshold, and determine that the surrounding environment is the water environment based on a fourth condition that the amplitude of the auxiliary measurement signal remains within a second threshold range for a second respective that satisfies the time threshold.

20. The ultrasonic touch sensor of claim 10, wherein the measurement circuit comprises:

an analog-to-digital converter (ADC) configured to receive the measurement signal and convert the measurement signal into a digital measurement signal;

a squaring circuit configured to perform a squaring function on the digital measurement signal to generate a rectified signal;

a low-pass infinite impulse response (IIR) filter configured to receive the rectified signal and generate an output signal; and a comparison circuit configured to compare the output signal with the first threshold or with the second threshold to determine whether the no-touch event or the touch event has occurred at the touch surface based on the first operation mode or the second operation mode, respectively.

21. The ultrasonic touch sensor of claim 10, wherein the measurement circuit comprises:

an analog-to-digital converter (ADC) configured to receive the measurement signal and convert the measurement signal into a digital measurement signal;

a squaring circuit configured to perform a squaring function on the digital measurement signal to generate a rectified signal;

a low-pass infinite impulse response (IIR) filter configured to receive the rectified signal and generate an output signal; and a comparison circuit configured to calculate a distance of the output signal relative to a reference signal to generate a measured value, compare the measured value with the first threshold or with the second threshold based on the first operation mode or the second operation mode, respectively, to generate a comparison result, and determine whether the no-touch event or the touch event has occurred based on the comparison result.

22. An ultrasonic touch sensor configured to be submerged under water, comprising:
- a housing having an ultrasound chamber;
- a touch structure comprising a touch surface configured to receive a touch, wherein the touch structure is coupled to the housing and arranged over the ultrasound chamber, and wherein the touch structure comprises a touch interface at the touch surface;
- a signal generator configured to generate an excitation signal for producing an ultrasonic transmit wave;
- a capacitive ultrasonic transmitter arranged within the ultrasound chamber, wherein the capacitive ultrasonic transmitter is configured to receive the excitation signal and transmit the ultrasonic transmit wave toward the touch structure based on the excitation signal while the touch surface is submerged under the water;
- a capacitive ultrasonic receiver arranged within the ultrasound chamber, wherein the capacitive ultrasonic receiver is configured to receive an ultrasonic reflected wave produced by a reflection of the ultrasonic transmit wave at the touch interface while the touch surface is submerged under the water and generate a measurement signal representative of the ultrasonic reflected wave; and
- a measurement circuit coupled to the capacitive ultrasonic receiver and configured to monitor for a signal change of the measurement signal during a predetermined time interval corresponding to the ultrasonic reflected wave, and determine whether a no-touch event or a touch event has occurred at the touch surface while the touch surface is submerged under the water based on whether the signal change is detected during the predetermined time interval.

23. The ultrasonic touch sensor of claim 22, wherein the measurement circuit is configured to detect the touch event based on detecting the signal change during the predetermined time interval.

24. The ultrasonic touch sensor of claim 22, wherein the signal change is an oscillation with at least one peak-to-peak amplitude exceeding a threshold.

25. The ultrasonic touch sensor of claim 22, wherein the signal change is an oscillation with a plurality of peak-to-peak amplitudes exceeding a threshold.

26. The ultrasonic touch sensor of claim 22, wherein the touch is an indirect touch made at the touch surface, wherein the indirect touch is a non-skin contact with a material.

27. The ultrasonic touch sensor of claim 22, wherein the signal change is a decrease in amplitude below a threshold.

* * * * *